(12) United States Patent
Ellis et al.

(10) Patent No.: US 10,138,077 B2
(45) Date of Patent: Nov. 27, 2018

(54) PNEUMATIC CONVEYING APPARATUS

(71) Applicant: Schenck Process UK Limited, Edinburgh (GB)

(72) Inventors: Richard Ellis, Doncaster (GB); Brian Snowdon, Doncaster (GB)

(73) Assignee: Schenck Process UK Limited, Edinburgh (GB)

( * ) Notice: Subject to any disclaimer, the term of this patent is extended or adjusted under 35 U.S.C. 154(b) by 0 days.

(21) Appl. No.: 15/326,691

(22) PCT Filed: Jul. 15, 2015

(86) PCT No.: PCT/GB2015/052051
§ 371 (c)(1),
(2) Date: Jan. 17, 2017

(87) PCT Pub. No.: WO2016/009206
PCT Pub. Date: Jan. 21, 2016

(65) Prior Publication Data
US 2017/0210574 A1    Jul. 27, 2017

(30) Foreign Application Priority Data
Jul. 17, 2014 (GB) .................................. 1412758.3

(51) Int. Cl.
*B65G 53/66* (2006.01)
*B65G 53/06* (2006.01)
(Continued)

(52) U.S. Cl.
CPC ............. *B65G 53/66* (2013.01); *B65G 53/06* (2013.01); *B65G 53/4691* (2013.01); *B65G 53/60* (2013.01)

(58) Field of Classification Search
CPC ........ B65G 53/60; B65G 53/64; B65G 53/66; B65G 53/06; B01J 8/003
(Continued)

(56) References Cited

U.S. PATENT DOCUMENTS 1,793,098 A * 2/1931 Kramer ................... B02C 13/13
                                                                    209/1
3,301,604 A * 1/1967 Berry ...................... B65G 53/22
                                                                    406/125
(Continued)

FOREIGN PATENT DOCUMENTS

CN          203672164 U      6/2014
EP          0021222 A1       1/1981
(Continued)

OTHER PUBLICATIONS

International Search Report for related International Application No. PCT/GB2015/052051, 6 pages (dated Oct. 16, 2015).

*Primary Examiner* — Joseph A Dillon, Jr.
(74) *Attorney, Agent, or Firm* — Eric D. Babych; Brinks Gilson & Lione (57) ABSTRACT

A pneumatic conveying apparatus operable to transport material from a supply source to a process which requires a rate of change of feed rate far in excess of what is possible from a typical pneumatic conveying system and pipeline alone, and for a process where storage of large volumes of material directly adjacent to the process feed point is either not possible or disadvantageous. The pneumatic conveying apparatus (100; 101;102) comprises at least one conduit (11) and a compression device (8) operable to supply and transport pneumatic media through at least one conduit (11). The supply source (1) may be a feed hopper and is operable to discharge material into the pneumatic conveying system downstream of the supply source. In the pneumatic convey- (Continued)

ing system at least one vessel (9; 9A, 9B; 20) is arranged to receive material from the supply source (1) and to discharge material to at least one conduit (11). The system also includes a filter receiver (4), which is configured to simultaneously receive and discharge material and pneumatic media from at least conduit. The filter receiver has a working volume or capacity which is very small in relation to the feed rate, typically 1 to 2 minutes storage when operating at the maximum discharge rate, and with a volume typically ½th to ⅛th of the volume of the vessels feeding material into the start of the pneumatic conveying pipeline. The filter receiver is equipped with a discharge device operable to increase the discharge rate to the process from the minimum feed rate to the maximum feed rate in a time period of 2 to 30 seconds. The filter receiver (4) is configured and operable to separate material and pneumatic media such that the material can be discharged from the filter receiver to the downstream process (2), in order to separate the conveying apparatus from the process and provide further advantages described within the invention. The apparatus includes a control system (19) that is operable to maintain a target weight and/or level within the filter receiver, and recover the target weight and/or level in the filter receiver, by measuring the weight and/or level and the rate of change of weight or level, of all storage vessels discharging material to the pneumatic conveying pipeline and process and incorporating aspects of closed loop control methodologies.

18 Claims, 3 Drawing Sheets

(51) Int. Cl.
  *B65G 53/46* (2006.01)
  *B65G 53/60* (2006.01)
(58) Field of Classification Search
  USPC ............... 406/23, 28, 144, 173, 175, 32
  See application file for complete search history.

(56) References Cited

U.S. PATENT DOCUMENTS

| | | | | |
|---|---|---|---|---|
| 3,994,701 | A * | 11/1976 | Schweimanns | C10J 3/00 406/175 |
| 4,106,817 | A * | 8/1978 | Tsuzuku | B65G 53/06 406/125 |
| 4,437,796 | A | 3/1984 | Ulveling et al. | |
| 4,576,526 | A | 3/1986 | Müller et al. | |
| 4,676,826 | A * | 6/1987 | Jortikka | G01G 13/10 75/540 |
| 5,478,172 | A * | 12/1995 | Oura | B01F 15/00194 406/106 |
| 5,562,366 | A * | 10/1996 | Paulson | B65G 53/525 406/12 |
| 6,890,129 | B2 * | 5/2005 | Fabbri | B01D 29/01 406/106 |
| 6,994,497 | B1 * | 2/2006 | Eriksson | B01J 8/0005 406/124 |
| 8,113,745 | B2 * | 2/2012 | Aoki | B65G 53/525 406/126 |
| 8,430,230 | B1 * | 4/2013 | Ferguson | B29C 31/02 198/540 |
| 2016/0016137 | A1 * | 1/2016 | Fan | B01J 8/085 422/142 |

FOREIGN PATENT DOCUMENTS

| | | |
|---|---|---|
| FR | 2617815 A1 | 1/1989 |
| GB | 1371375 A | 10/1974 |
| JP | S 5467970 A | 5/1979 |
| JP | S 5751618 A | 3/1982 |
| JP | S 5811421 A | 1/1983 |
| JP | S 62-257816 A | 11/1987 |
| JP | H 01-261120 A | 10/1989 |
| JP | H 0710271 A | 1/1995 |

* cited by examiner

PNEUMATIC CONVEYING APPARATUS

This application is a National Stage application of International Application No. PCT/GB2015/052051, filed Jul. 15, 2015. This application also claims priority under 35 U.S.C. § 119 to Great Britain Application No. 1412758.3, filed Jul. 17, 2014.

FIELD OF THE INVENTION

The present invention relates to an apparatus operable to pneumatically convey bulk materials. More particularly, the present invention relates to an apparatus operable to pneumatically convey bulk materials where conveying rate can be varied according to demand.

BACKGROUND OF THE INVENTION

A conveyor system is used as material handling equipment in many different industries. Examples of conveying devices are belt conveyers, chain conveyers, vibrating conveyers and link conveyers. Pneumatic conveying is the process of transporting bulk materials in a gas stream, for example air or nitrogen, through a pipeline.

When a pneumatic conveying system is delivering material, for example fuel or raw materials, to a process that frequently requires an adjustment in the pneumatic conveying feed rate, the response time possible from the pneumatic conveying system is limited by how quickly material can travel through the pipeline. When the conveying distances typically exceed for example 200m, with an average conveying velocity of 10 m/s, it takes an average 20 seconds for the conveying rate to start to increase at the process located at the end of the 200 m conveying pipeline. If the conveying rate then takes, for example, a further 30 seconds to increase from the lowest to the highest feed rate at the start of the pipeline, due to physical limitations over how the feed device can be operated, then it can typically take e.g. 50 seconds in practice for the maximum feed rate to be seen at the process.

Other factors such as how quickly the pressure in the conveying system over such a distance can be raised, the risk of pipeline blockages, or the impact of higher velocity's creating additional wear or material damage, can further limit the response time possible from a pneumatic conveying system directly feeding a process connected to the end of the conveying pipeline.

In order to solve these problems, often a large volume (typically 30 minutes up to several hours worth at maximum capacity) of material is stored directly adjacent to the feed point to the process. However, this is often compromised by the size and cost of the storage at the feed point, or is not possible due to an absence of space especially in complex processes, or in process plant that already exists and whose design and construction is not easily changed or adapted.

It is desirable to provide an improved pneumatic conveying system; one, which at least mitigates one or more of the above problems.

It is desirable to provide an improved pneumatic conveying system which can more rapidly increase or decrease feed rate compared with typical pneumatic conveying arrangements, without a relatively large amount of material storage directly at the process feed point.

SUMMARY OF THE INVENTION

According to a first aspect of the present invention there is provided a pneumatic conveying apparatus operable to transport material from a supply source to a process, the pneumatic conveying apparatus comprising:

a compression device operable to supply and transport pneumatic media through at least one conduit;

a supply source operable to discharge material into the pneumatic conveying system;

at least one vessel arranged to receive material from the supply source and to discharge material to the at least one conduit;

a filter receiver configured to receive material and pneumatic media from at least one conduit and operable to separate material and pneumatic media such that a predefined and small volume or weight of material can be simultaneously stored and discharged from the filter receiver to an adjacent process, where a process connection which is formed where the apparatus connects to the process is within a 1 m to 15 m horizontal or vertical range;

a discharge device operable to increase its feed rate from the minimum feed rate to the maximum feed rate over a time frame of between 3 seconds to 30 seconds in order to discharge material to the process in a way which meets the process demands. a control system operable to control discharge rate of material and pneumatic media such that material is transported substantially continuously along the conduit to the filter receiver; and a control system able to measure and subsequently maintain and/or recover to a fixed weight or volume, the amount of material stored in the filter receiver, by varying the rate of feed to the pneumatic conveying pipeline according to close loop control methods.

In a pneumatic conveying system according to the first aspect of the present invention the filter receiver has a small storage capacity in relation to the feed rate, typically storing less than 1-2 minutes capacity at the maximum feed rate. The filter receiver provides a final stage of the conveying system before material is discharged to the process which is typically located in close proximity. As such the filter receiver facilitates means to rapidly increase or decrease the feed rate from the system to the process at a rate of change far in excess of the rate of change of feed rate possible from a pneumatic conveying system alone and without the need to store large volumes of material at the end of the pneumatic conveying pipeline. Therefore, the pneumatic conveying system according to the first aspect of the present invention permits the use of a pneumatic conveying system with a process that, at least from time to time requires a rapid rate of change of material feed, for example from the minimum feed rate to the maximum feed rate or from maximum feed rate to zero in 30 seconds or less, and is not able to store large quantities of material directly adjacent to the process.

The filter receiver creates a material buffer operable to collect material, separate the pneumatic transport media (gas e.g. air) from the material and to feed the material to an end process. The filter receiver will be arranged to receive material from a continuous pneumatic conveying system such that constant weight or level is maintained and/or recovered after a rapid change in feed rate directly to the process. When the process demand suddenly increases at a rate beyond which the pneumatic conveying system can match, the volume of stored material in the receiver will fall and the control system will gradually increase over time the conveying rate to the pneumatic conveying pipeline, such that the conveying rate to the pipeline eventually exceeds the actual demand of the process. In this way the weight and/or volume of material stored in the filter receiver will increase and recover to the required steady state target point within a predefined time period. Further, the control system will control the rate of increase of feed rate to the pneumatic conveying pipeline such that the filter receiver volume or weight never falls below a predefined minimum level, in order to ensure the discharge device from the filter receiver operates predictably across the full operating range, and that the process never suffers a sudden shortage of material feed. In order to ensure this condition, it was discovered that the storage volume of the filter receiver must be approximately ½ to ⅛$^{th}$ of the volume of the vessel feeding the pneumatic conveying pipeline. The provision of such a filter receiver results in reduction or elimination of material pulsation to the process, that typically arises from pneumatic conveying, with the added benefit that the material is fed more smoothly and predictably to the process.

Many processes benefit from transporting material with the minimum of or no pulsation and as such a smooth transportation to the process can lead to, for example, improved chemical or other reactions in the process, or improved downstream processing or cleaning of vented gas. Furthermore, the use of the filter receiver allows the velocity of the material from the pneumatic conveying system to be arrested allowing the material to enter the process at low velocity. Benefits of having a low velocity entry of material are, for example, minimising wear due to impact or erosion or minimising dust generation arising from velocity related attrition or increasing residence time of the delivered material within the process. Thereby the effectiveness and or efficiency of the process overall is improved in many cases.

A pneumatic conveying system in accordance with the present invention can, for example, prevent or reduce dust emission because a pneumatic conveying system involves totally enclosed material handling, totally enclosed explosion containment if required, convenient positioning of equipment especially facilitated by the small volume of the receiving vessel relative to the total conveying rate, and few moving parts. Therefore, the system represents a low maintenance system compared to other solutions.

The control system will comprise of electrical microprocessor logic control (or similar, e.g. pneumatic logic). Logic control and/or a weighing system and/or a volume measurement system will be operable to measure/monitor the conveying rate of material to the filter receiver, to measure the rate of change of weight or level in the filter receiver and will be operable to adjust conveying rate to the filter receiver such that target weight or level of material in the receiver is achieved by increasing, decreasing or maintaining the feed rate to the pneumatic conveying pipeline using closed loop control methodologies as required. The control system may comprise a plurality of mechanical feed devices operated by electrical or pneumatic rotation, motor variable speed drives and/or position sensors. A mechanical feed device may be provided between the supply source and at least one vessel. A mechanical feed device may be provided on exit from at least one vessel.

One or more feed devices may be provided on the exit of the filter receiver. The feed device may be operable to increase feed rate of material from the minimum feed rate to the maximum feed rate in a range of 3 to 30 seconds or less.

The filter receiver may include filtration means and/or cyclonic separation and/or ducting means in order to separate the conveyed material from the conveying media, for example air or nitrogen.

At least one vessel may comprise a pressurized vessel. Alternatively, at least one vessel may comprise an unpressurised vessel.

At least one vessel and the filter receiver may comprise weight/mass or level sensing, wherein the vessels are operable to receive and/or discharge material at predetermined weight/and/or level of material contained in the vessel. At least one vessel will be operable to control the rate of change of weight and/or level of material.

The system may further comprise a plurality of vessels arranged in series with the source vessel, wherein material can be discharged from the source vessel and received by a first vessel, which material can be subsequently discharged from the first vessel to a second vessel, upon reaching a predetermined weight and/or level of material the second vessel is operable to discharge material into the pipeline to be transported through the pipeline by the pneumatic media.

Alternatively, the system may further comprise a plurality of vessels arranged in parallel, wherein a first vessel and second vessel are each in communication with the source vessel, the first vessel being arranged to receive material discharged from the source vessel and to discharge material into the pipeline and the second vessel being arranged to receive material discharged from the source vessel and to discharge material into the pipeline, wherein the first vessel and the second vessel receive and discharge material alternately, wherein when the first vessel is receiving material from the source vessel the second vessel is discharging material to the pipeline and when the second vessel is receiving material from the source vessel the first vessel is discharging material to the pipeline. Both the first and second vessel may receive material from the source vessel simultaneously, but discharge of material from the first and second vessel to the pipeline is separately and alternately, with the intention of maintaining continuous conveying.

The system may comprise one or more vents, wherein each vent is controllable by the control system such that when the one or more vents are open pressure can be bled from at least part of the system and when the one or more vents are closed pressure can increase or be maintained in at least part of the system.

Apparatus according to the present invention provides a means of rapidly increasing or decreasing the feed rate from the end of the system at a rate of change far in excess of the rate of change of feed rate possible from a pneumatic conveying system alone. Therefore, apparatus according to the present invention permits the use of a pneumatic transfer system with a process that may from time to time require a rapid rate of change of material feed, typically from the minimum feed rate to the maximum feed rate in 3 to 30 seconds or less, in circumstances where the amount of storage space close to the process connection is restricted, or it is advantageous for a plurality of reasons to have very small storage capacity at the process entry point. Such reasons could comprise cost benefits, space restrictions, maintenance and/or service requirements, or safety related reasons such as explosion containment or venting, or the storage of potentially dangerous substances.

It will be appreciated that to increase the conveying rate in a pneumatic conveying system and to also maintain conveying at optimum conditions across the range of functionality required by the process, it may be necessary to provide more pneumatic transport media (e.g. gas or air) into the system than would otherwise be necessary under steady state conditions. A rapid increase in feed rate can therefore require significant amounts of additional air flow/energy during the period of rate change, in order to avoid blockages by the material in the conveying pipeline. This is especially of concern when the conveying pipeline receives the conveyed material from pressurised vessels as described by the present invention. This is because any changes in conveying pipeline pressure must also occur in the pressurised vessel, which slows the rate of increase in the pressure of the whole system due the total increased volume, and consequently reducing the rate at which the feed rate can be increased unless additional pressurisation air is provided. By utilising the apparatus described, the amount of additional peak energy or peak gas flow capacity required by the pneumatic conveying system from the compression device when the rate is increased is significantly reduced or eliminated, bringing benefits of reduced power consumption and/or reduced motor sizes on the compression device.

The present invention uses an intermediate storage stage of relatively very small volume, in the form of the filter receiver. By utilising this system any excess capability required by the process to cope with the short time frame high rates of material feed rate change and/or increased gas flow, is reduced which may have a significant impact on the cost of producing, purchasing, installing and operating the process itself. However, if the pneumatic conveying system was configured to feed the process directly i.e. excluding the receiving vessel, the process itself would require additional capability to cope with the pneumatic transport media used to convey the material, as the facility to separate the conveyed media from the pneumatic media no longer exists. This can be a significant disadvantage for many processes.

If the pneumatic conveying system were to feed the process directly, any pressure in the receiving process must be overcome by the pneumatic conveying system, thus increasing the power required to pneumatically convey the material. By utilising an arrangement according to the present invention, the pressure in the process can be isolated from the conveying system by means of the one or more feed devices described above with the advantage of reduced conveying power consumption.

If the pneumatic conveying system were to feed the process directly, considerations must be given in the design of the process for the potential for the pneumatic system to pressurise the process; thereby potentially placing the receiving process within the scope of local pressure regulations and its associated consequences. By using the apparatus according to the present invention, the pressure in the pneumatic conveying system can be isolated from the process, facilitating potentially removing pressure design considerations or requirements from the process itself.

A further aspect of the present invention provides a method of increasing or decreasing feed rate from a pneumatic conveying apparatus comprising the steps of transporting material from a supply source to a process and utilizing the pneumatic conveying apparatus comprising:

discharging material from a supply source into the pneumatic conveying system;

receiving material from the supply source and discharging material to the at least one conduit;

supplying and transporting pneumatic media through at least one conduit using a compression device;

discharging material and pneumatic media from the at least one conduit; receiving material and pneumatic media at a filter receiver of relatively very small volume;

separating material and pneumatic media such that the material can be discharged from the filter receiver to the process;

discharging material from the filter receiver to the process; and controlling discharge rate of material and pneumatic media thereby substantially continuously transporting material along the conduit to the filter receiver.

The pneumatic conveying apparatus may be as defined in the first aspect.

Maintaining a target weight and/or level in the filter receiver, and/or recovery to the target weight and/or volume, by adjusting the feed rate and rate of change of feed rate to the pneumatic conveying pipeline which subsequently transports material to the filter receiver.

The method may further comprise controlling feed rate of material discharged from the filter receiver to the process, wherein controlling comprises increasing, decreasing or maintaining feed rate in a predetermined range.

DESCRIPTION OF THE DRAWINGS

Embodiments of the present invention will now be described, by way of example only, with reference to the accompanying drawings in which.

DESCRIPTION

Figure 1:
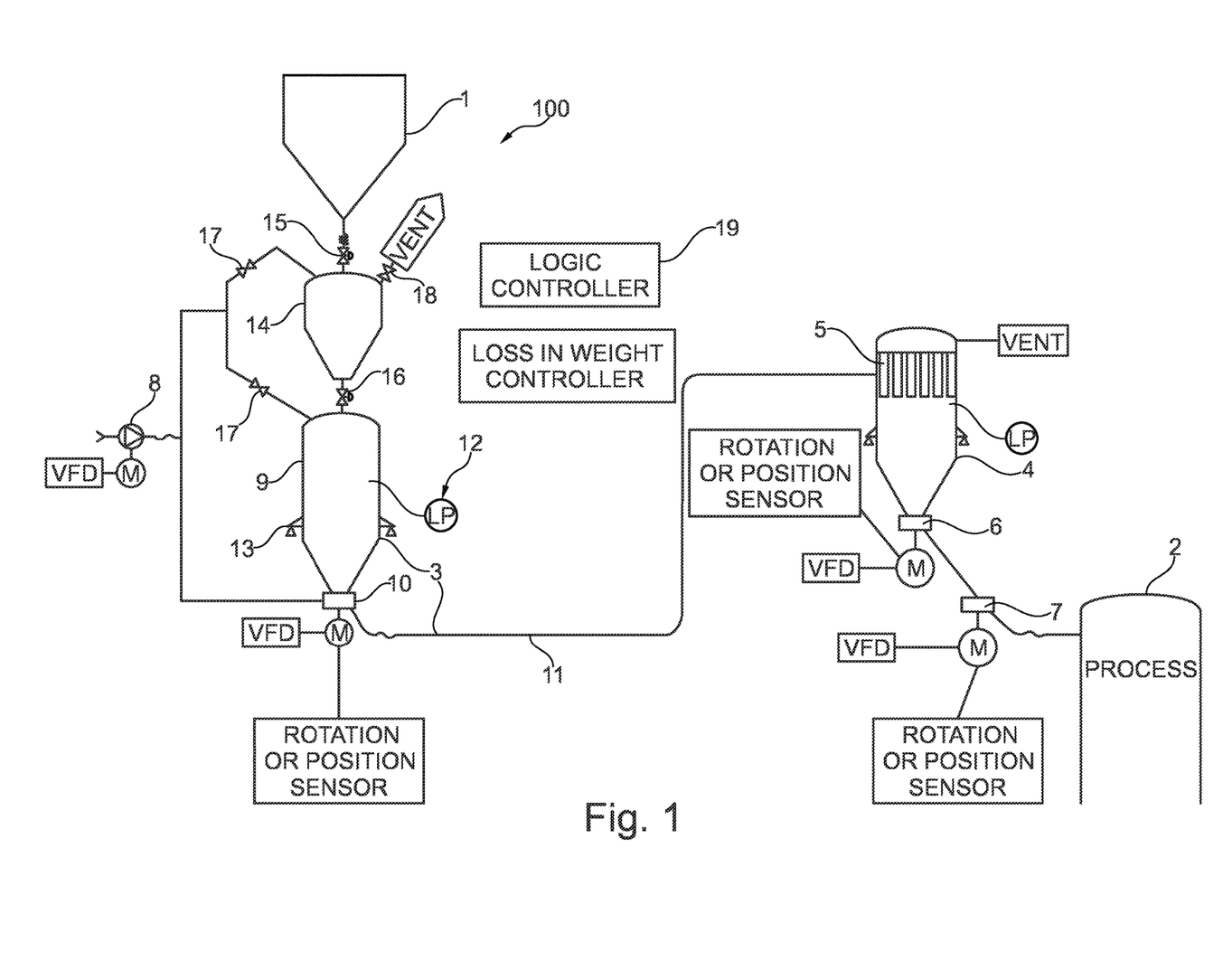
FIG. 1 is schematic representation of a pneumatic conveyor system according to an embodiment of the present invention.

FIG. 1 illustrates a pneumatic conveyor system 100, where bulk material is conveyed from a storage vessel or feed hopper 1 to a process 2. Examples of applications for such systems is the conveying of fuels or additives (bulk material) to, for example, mills, furnaces, reactor vessels and similar, all of which are examples of processes 2 as indicated in FIG. 1.

In the illustrated example the material is conveyed from the feed hopper 1 to the process 2 using a combination of a pressurised pneumatic conveying system 3, a receiving vessel 4 and one or more mechanical conveying device(s) 6.

As described above the illustrated example represents a pneumatic conveying system. As such pneumatic media is required to transport the material through the apparatus. In the present example the pneumatic media is gas, typically compressed air. The gas is provided by a gas compression device 8. The flow rate from the gas compression device 8 is controlled. It will be appreciated that the flow control can be controlled by standard means, examples of which could be varying the rotation speed of the compression element, using flow control valves and flow meters, using square edged orifice plate or using delaval nozzles.

In the illustrated example, bulk material is fed into a pneumatic conveying pipeline 11 from a pressurised vessel 9 via a feed device 10, which is operable to control and/or regulate and/or restrict the flow of material from the pressurised vessel 9 to the pipeline 11. The pneumatic media (gas) supplied by the compression device 8 is delivered to the pipeline 11 and is operable to transport the bulk material through the pipeline 11 to the receiving vessel 4. Within the receiving vessel 4 the gas (conveying media) is separated from the bulk material using, for example, filtration and/or cyclonic/centrifugal and/or ducting, separation such that only the bulk material is transported to the final process 2.

The pressurised vessel 9 operates between a high level or weight 13 and a low level 12 or weight 13 to feed bulk material continuously into the pipeline 11 via the feed device 10.

In the illustrated example an intermediate feed device 14 is provided such that when the pressurised vessel 9 reaches a low level or weight, it can receive material from the feed hopper 1 via the intermediate feed device 14 (a pressurised "Lock" vessel). As such continuous conveying of material through the feed device 10 and the conveying pipeline 11 to the receiving vessel 4 is assured.

The intermediate feed device or pressurised "Lock" vessel 14 acts to refill the pressurised vessel 9 by cycling between the pressure in the feed hopper 1 and the pressure in the pressurised vessel 9, with material travelling from the feed hopper 1 to the lock vessel 14 via a valve 15 when the pressure in the feed hopper 1 and the pressurised vessel 9 are equal and subject to time or weight based signals.

Subsequently, material passes from the vessel 14 to the pressurised vessel 9 via a valve or feed device 16, when the pressure in the vessel 14 is equal to the pressure in the pressurized vessel 9 and subject to time or weight based signals.

The delivery of gas to the system is controlled and is introduced into vessels 14 and 9 via valve 17, or a plurality of valves 17. The valves 17 also operate as a vent and a further vent 18 is provided in the lock vessel 14 to control gas flow, pressure and material flow through the system.

The arrangement of pressurising valve 17, or a plurality of pressurising valves 17 can configured according to the methods required to satisfactory pressurise and discharge the vessels. These methods often vary according to the characteristics of the materials being conveyed.

The sequence to fill, discharge, refill, pressurise and de-pressurise (vent) the apparatus is provided by a logic controller 19.

The transported material accumulates within the receiving vessel 4 until a target weight and level are achieved. When the predetermined level is reached the material is transported to the process 2. In the illustrated example, the transfer of material from the receiving vessel 4 to the process 2 is via one or more mechanical feed devices 6.

The system 100 includes a control system 19, which is operable to monitor, make adjustments and maintain feed rate of material through the system, using closed loop control methods and process control techniques such as proportional-integral-derivative methods singly or in combination. The control system is operable to control the level or weight of material in the receiving vessel 4 by varying the feed rate from the pressurised vessel 9 and by adjusting the position or rotational speed of the feed device 10.

When the system, in particular the feed devices 6, 10 is operating under steady state conditions the level or weight in receiving vessel 4 remains constant and is referred to as the target weight, and is under the control of the control system 19.

Figure 2:
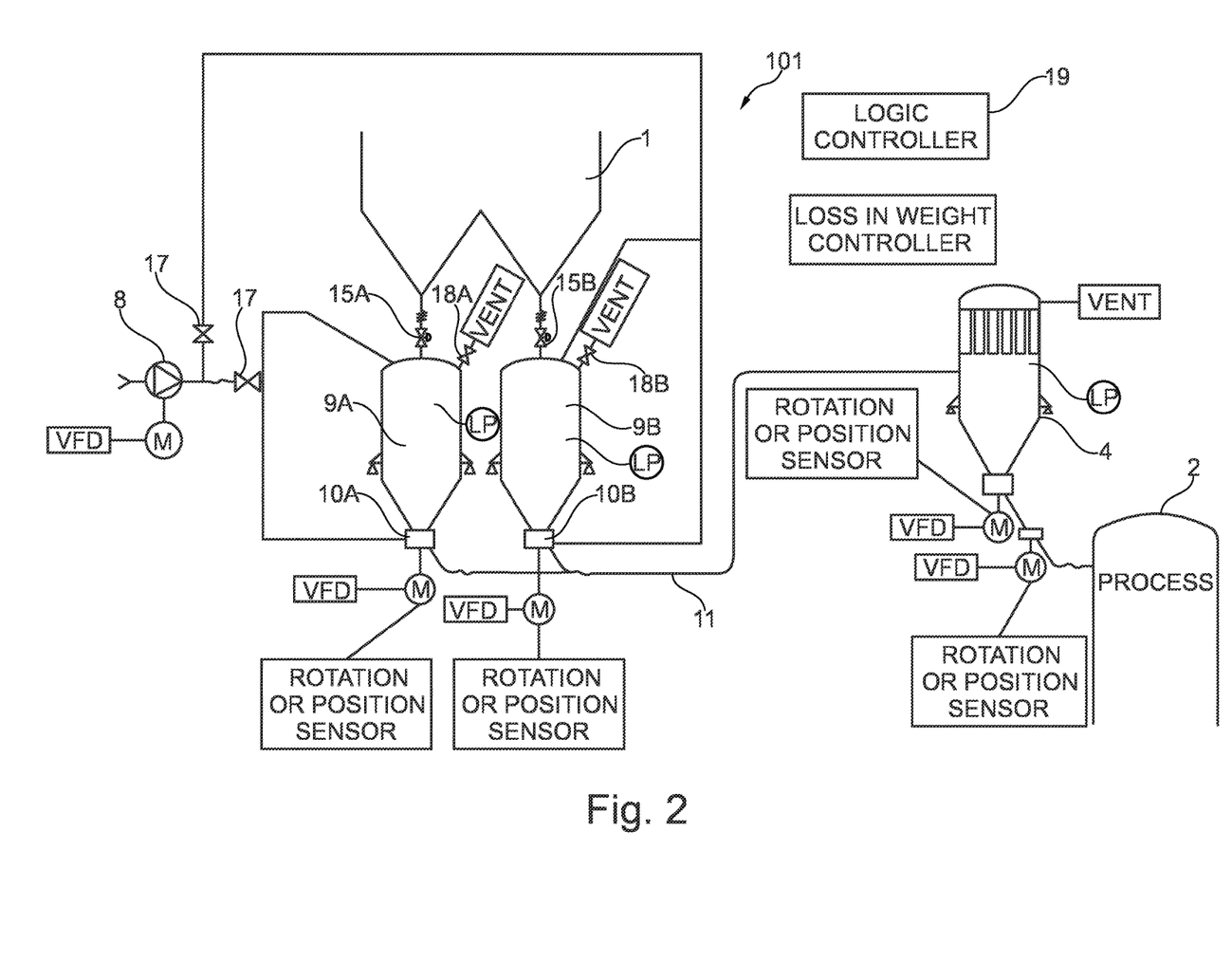
FIG. 2 is schematic representation of a pneumatic conveyor system according to an embodiment of the present invention.

FIG. 2 illustrates a pneumatic conveying system 101, which shows an alternative method of transporting material from a feed hopper 1 to a receiving vessel 4.

In the example illustrated in FIG. 2, two pressurised vessels 9A and 9B are included. In the process of transporting material from the feed hopper 1 to the receiving vessel 4 the bulk material passes from the feed hopper 1 to pressurised vessel 9A via a valve 15A and is then transported into the pneumatic conveying pipeline 11 via a feed device 10A, which is operable to control and/or restrict and/or regulate the flow of material from the pressurised vessel 9A to the pipeline 11. As in the example illustrated in FIG. 1 the pressurised vessel 9A operates between a high level or weight status and a low level or weight status to feed material continuously into the pipeline 11 via the feed device 10A.

In the example illustrated in FIG. 2, the two pressurised vessels 9A and 9B are filled sequentially or simultaneously, but each individually feeds material via feed devices 10A and 10B respectively on separate occasions, whereby the vessels 9A and 9B alternately feed material to the pipeline 11.

When the first vessel 9A reaches a level or weight which is between full and empty, the second vessel 9B is filled from the feed hopper 1 via a valve 15B. When the second vessel 9B is determined full, in relation to volume, weight and/or time the pressure in vessel 9B is increased using valve 17 or a plurality of valves 17 to equalise the pressure in the second vessel 9B with the pressure in vessel 9A and/or the pipeline 11. When the vessel 9B is full and the pressures are equalised, as discussed above, material is transported to the pipeline 11 from the second vessel 9B via the feed device 10B. At the same time material stops being transported to the pipeline 11 from the first vessel 9A via the feed device 10A.

The arrangement of pressurising valve 17, or a plurality of pressurising valves 17 can be configured according to the methods required to satisfactory pressurise and discharge the vessels. These methods often vary according to the characteristics of the materials being conveyed.

When discharge of material from either vessel 9A or 9B stops, thereby making the vessel temporarily redundant in this regard, the redundant vessel 9A or 9B is depressurised using the appropriate vent 18A or 18B to equalise pressure within the vessel 9A or 9B with the pressure in the feed hopper 1 such that the vessel 9A or 9B receives material from the feed hopper.

In the process illustrated by FIG. 2 the conveying of material between the feed hopper 1 and the receiving vessel 4 continues with the vessels 9A, 9B and the feed devices 10A, 10B operating alternately, for example, vessel 9A is discharging material to the pipe line 11 via feed device 10A whilst the vessel 9B receives material from the feed hopper 1 via valve 15B until at predetermined level/weight is attained at which point discharge from vessel 9A terminates and discharge from vessel 9B begins. As such continuous feed of material to the pipeline is assured by the system controller 19.

The control systems functions in a manner similar to the method described for FIG. 1.

Figure 3:
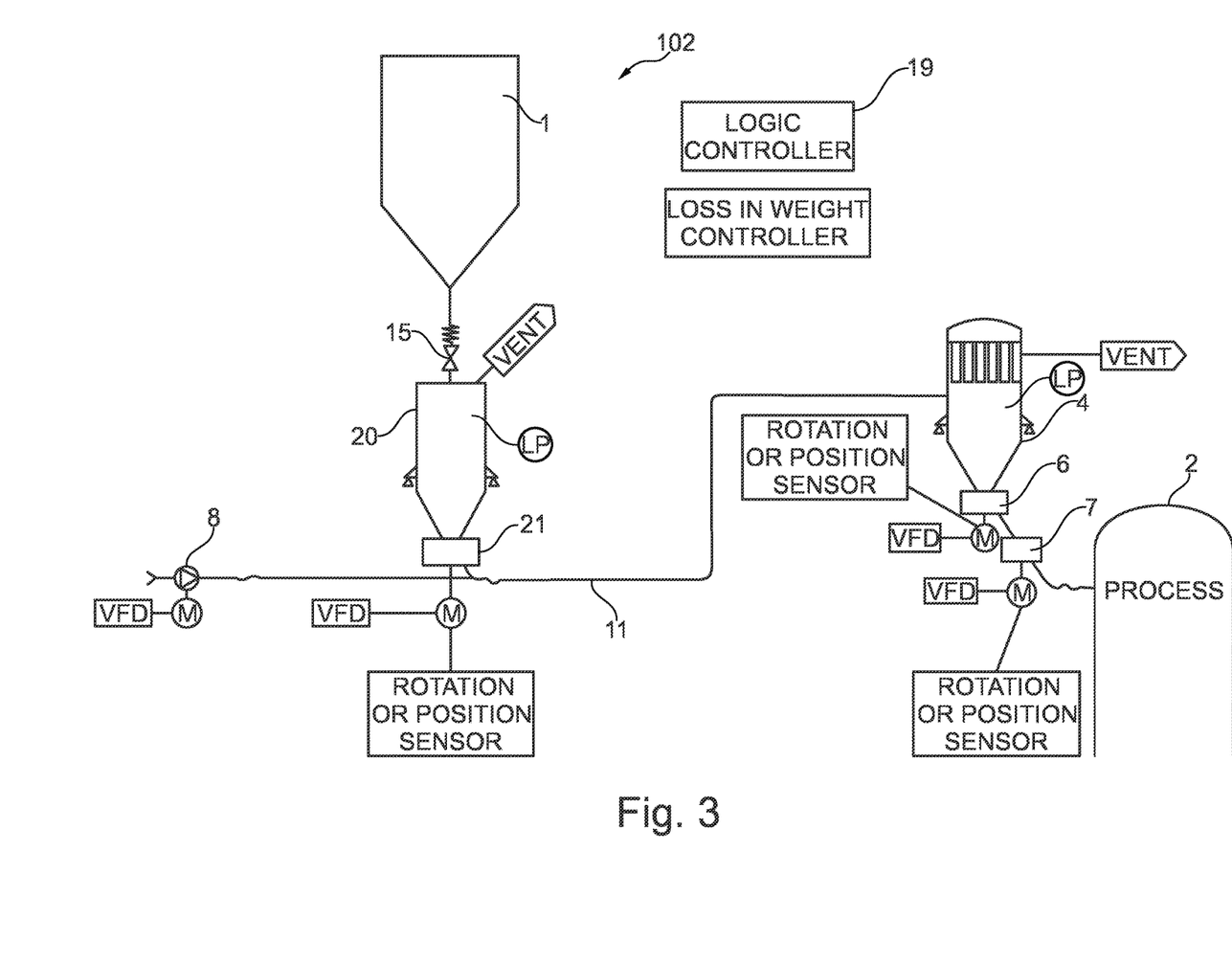
FIG. 3 is schematic representation of a pneumatic conveyor system according to an embodiment of the present invention.

FIG. 3 illustrates a pneumatic conveying system 102, which shows an alternative method of transporting material from a feed hopper 1 to a receiving vessel 4.

In the example illustrated in FIG. 3 an unpressurised vessel 20 is included. In the process of transporting material from the feed hopper 1 to the receiving vessel 4 the bulk material passes from the feed hopper 1 to the unpressurised vessel 20 via a valve 15 and is then transported into the pneumatic conveying pipeline 11 via a feed device 21, which is operable to control and/or restrict and/or regulate the flow of material from the unpressurised vessel 20 to the pipeline 11. The feed device 21 is also capable of forming a suitable pressure barrier between the vessel 20 and the conveying pipeline 11.

The transportation of material through the pipeline 11 to the receiving vessel 4 and beyond to the final process 2 is common to each example illustrated in FIGS. 1, 2 and 3.

As in the examples illustrated in FIG. 1 and FIG. 2 the system 102 operates continuously with the unpressurised vessel 20 being filled according to weight, level and time based signals, for example when the vessel 20 reaches low level or weight, it can be re-filled with material discharged from the feed hopper 1 via the valve or feeding device 15.

In the examples illustrated in FIGS. 1, 2, and 3 the receiving vessel 4 is equipped with feed device 6, which facilitate discharge of material from the receiving vessel to the adjacent process.

The feed device 6 is configured such it is operable and capable of increasing or decreasing the feed rate from the minimum to the maximum or from the maximum rate to the minimum rate o very quickly and typically in the range 3 to 30 seconds. It will be appreciated that the increase or decrease possible from the feed device 6 is much faster than the increase or decrease possible from a pneumatic conveying system 3 because of the time taken for material to travel through the conveying pipeline 11 and also because of the time taken to change the pressure in the system for example the vessels 9; 9A, 9B as influenced by the supply capacity of the compression device 8, and the associated available motor power.

It will be appreciated that the feed device 6 can respond to an increase or decrease in feed rate faster than the pneumatic conveying system 3 can respond. As such the system 100, 101, 102 using the control device 19 will adjust the weight and/or level and/or rate of change of weight or level in the receiving vessel such that the weight and/or level in the receiving vessel 4 is representative of a predetermined steady state position. As such the control system 19 is operable to adjust system conditions, such as the feed rate of the pneumatic system 3, and the feed devices 10, 10A, 10B, 21 to ensure that the weight/level of material in the receiving vessel 4 is recovered to or maintained at the target level.

The control system 19 is configured to monitor, adjust, control the relationship between the components of the overall system 100, 101, 102, for example the feed rate of devices 6, 7, 10, 10A, 10B, 21 is controlled such that continuous feed of material is assured and such that the material discharged from the receiving vessel 4 to the process 2 is optimised for conveying and process conditions.

Whilst specific embodiments of the present invention have been described above, it will be appreciated that departures from the described embodiments may still fall within the scope of the present invention.

The invention claimed is:

1. A pneumatic conveying apparatus operable to transport material from a supply source to a process, the pneumatic conveying apparatus comprising:
   a compression device operable to supply and transport pneumatic media through at least one conduit;
   a supply source operable to discharge material into the pneumatic conveying system;
   at least one vessel arranged to receive material from the supply source and to discharge material to the at least one conduit;
   a filter receiver configured to receive material and pneumatic media from at least one conduit and operable to separate material and pneumatic media such that a predefined and small volume or weight of material can be stored in and a large capacity discharged from the filter receiver to an adjacent process, where a process connection which is formed where the apparatus connects to the process is within a 1 m to 15 m horizontal or vertical range;
   a discharge device connected to the filter receiver and operable to increase its feed rate from the minimum feed rate to the maximum feed rate over a time frame of between 3 seconds to 30 seconds in order to discharge material to the process in a way which meets the process demands and is greater than the rate of increase possible from the pneumatic conveying system alone, using control system operable to control discharge rate of material such that material is transported substantially continuously; and
   a control system able to measure and subsequently maintain and/or recover to a fixed weight or volume, the amount of material stored in the filter receiver, by varying the rate of feed to the pneumatic conveying pipeline according to close loop control methods.

2. A pneumatic conveying apparatus as claimed in claim 1, wherein the storage capacity of the filter receiver is in the range of 1 to 2 minutes conveying capacity at the maximum rate and where the volume of the filter receiver is in the range of ½ to ⅛th of the volume of the vessel receiving material from the supply source.

3. A pneumatic conveying apparatus as claimed in claim 1, wherein the control system comprises logic control, incorporating closed loop control features and process control techniques such as proportional-integral-derivative methods singly or in combination, operable to control the weight and/or level and/or the rate of change of rate or level of material stored within the filter receiver by controlling the rate of discharge of material into the start of the pneumatic conveying pipeline and consequently to the filter receiver.

4. A pneumatic conveying apparatus as claimed in claim 1, wherein a control system is also operable to maintain the weight and/or level of material within the filter receiver between predetermined upper and lower limits, such that the discharge device transporting material to the process can never suffer a sudden shortage of material.

5. A pneumatic conveying apparatus as claimed in claim 1, wherein the control system comprises a plurality of mechanical feed devices operated by motorized, or pneumatic rotation and/or position sensors.

6. A pneumatic conveying apparatus as claimed in claim 5, comprising one or more mechanical feed devices between the supply source and at least one vessel.

7. A pneumatic conveying apparatus as claimed in claim 5, comprising one or more mechanical feed devices on the exit from the at least one vessel.

8. A pneumatic conveying apparatus as claimed in claim 5, comprising one or more feed devices on the exit of the filter receiver, wherein the feed device is operable to provide the feed rate, and rate of change of feed rate, required by the process.

9. A pneumatic conveying apparatus as claimed in claim 5, wherein the feed device is operable to increase, decrease or maintain feed rate of material from zero to 30 seconds.

10. A pneumatic conveying apparatus as claimed in claim 1, wherein the filter receiver includes one or more filtration means, cyclonic separation means, centrifugal separation means, duct work, or a combination thereof.

11. A pneumatic conveying apparatus as claimed in claim 1, wherein at least one vessel comprises a pressurized vessel and/or a pressurized conveying pipeline.

12. A pneumatic conveying apparatus as claimed in claim 1, wherein at least one vessel comprises an unpressurised vessel.

13. A pneumatic conveying apparatus as claimed in claim 1, wherein at least one vessel and the filter receiver comprise weight or level sensing, wherein the vessels are operable to receive and/or discharge material at predetermined weight and/or level of material contained in the vessel.

14. A pneumatic conveying apparatus as claimed in claim 1, further comprising a plurality of vessels arranged in series with the source vessel, wherein material is dischargeable from the source vessel and receivable by a first vessel, which material can be subsequently discharged from the first vessel to a second vessel, upon reaching a predetermined weight and/or level of material the second vessel is operable to discharge material into the pipeline to be transported through the pipeline by the pneumatic media.

15. A pneumatic conveying apparatus as claimed in claim 14, wherein both the first and second vessel are arranged to receive material from the source vessel simultaneously and to discharge material from the first and second vessel to the pipeline separately and alternately.

16. A pneumatic conveying apparatus as claimed in claim 1, further comprising a plurality of vessels arranged in parallel, wherein a first vessel and second vessel are each in communication with the source vessel, the first vessel being arranged to receive material discharged from the source vessel and to discharge material into the pipeline and the second vessel being arranged to receive material discharged from the source vessel and to discharge material into the pipeline, wherein the first vessel and the second vessel receive and discharge material alternately, wherein when the first vessel is receiving material from the source vessel the second vessel is discharging material to the pipeline and when the second vessel is receiving material from the source vessel the first vessel is discharging material to the pipeline.

17. A pneumatic conveying apparatus as claimed in claim 1, further comprising one or more vents, wherein each vent is controllable by the control system such that when each vent is open pressure can be bled from at least part of the apparatus and when one or more vents are closed pressure can increase or be maintained in at least part of the apparatus.

18. A pneumatic conveying apparatus as claimed in claim 1 whereby the control of valves for material transfer and/or gas pressurization are operated according to microprocessor based logic control or pneumatic logic in order to achieve pressurization and movement/transfer of the material.

* * * * *